No. 775,631. Patented November 22, 1904.

UNITED STATES PATENT OFFICE.

ROBERT McCARREL, OF JACKSONVILLE, FLORIDA.

PLASTIC COMPOSITION.

SPECIFICATION forming part of Letters Patent No. 775,631, dated November 22, 1904.

Application filed August 20, 1904. Serial No. 221,557. (No specimens.)

*To all whom it may concern:*

Be it known that I, ROBERT McCARREL, a citizen of the United States, residing at Jacksonville, in the county of Duval and State of Florida, have invented new and useful Improvements in Plastic Composition, of which the following is a specification.

My invention relates to a composition for artificial stone and stucco; and it consists in the following ingredients: Portland cement, hydraulic lime, ground coral, fine sand, and ground granite.

In carrying out my invention I take hydraulic lime, two parts, and thoroughly mix the same with damp sand, two parts, ground coral, two parts, and ground granite, one-half part. This mixture is left in a heap for about twenty-four hours to allow the lime to cool. Portland cement, one part, is then added, after which the whole mixture is run through a revolving sieve and the ingredients thoroughly mixed. After this step the mixture is dampened just enough to start it to set, and it is then tamped in molds of any desired size or shape.

This composition produces a strong and durable artificial stone, and it can also be used for stucco. The coral gives the composition the texture and appearance of oölitic limestone. It also closes the pores and solidifies the composition, so that it can be cut, carved, and otherwise worked, and also split with wedges the same as natural stone, and it keeps the same color and texture on chiseled parts as on molded parts.

Having thus described my invention, what I claim as new, and desire to secure by Letters Patent, is—

1. As a composition of matter, hydraulic lime, ground coral, sand, ground granite and Portland cement combined in about the proportions set forth.

2. A process for the production of a plastic composition consisting in mixing two parts of hydraulic lime with two parts of damp sand, two parts of ground coral and one-half part of ground granite and then leaving this mixture to cool; then adding one part of Portland cement and mixing it therewith; and then dampening the mixture and tamping it in molds.

In testimony whereof I have signed my name to this specification in the presence of two subscribing witnesses.

ROBERT McCARREL.

Witnesses:
CHAS. W. KINNE,
ALX HEDENGGERN.